UNITED STATES PATENT OFFICE.

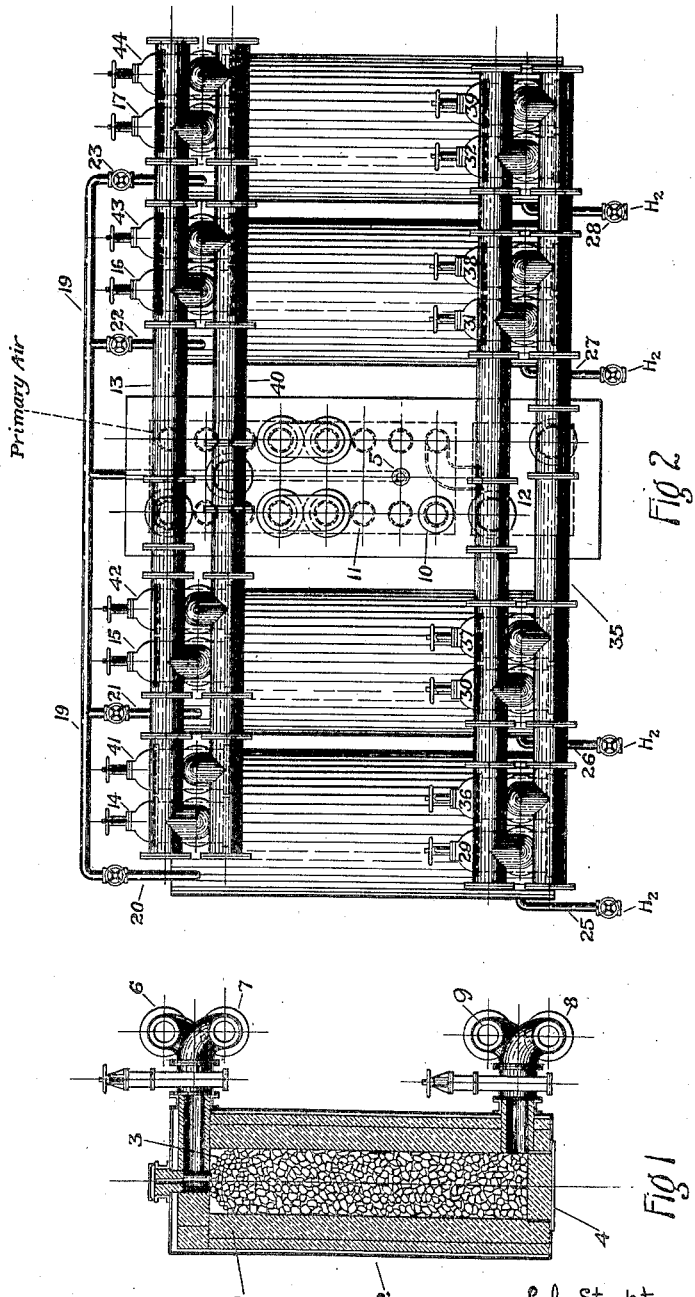

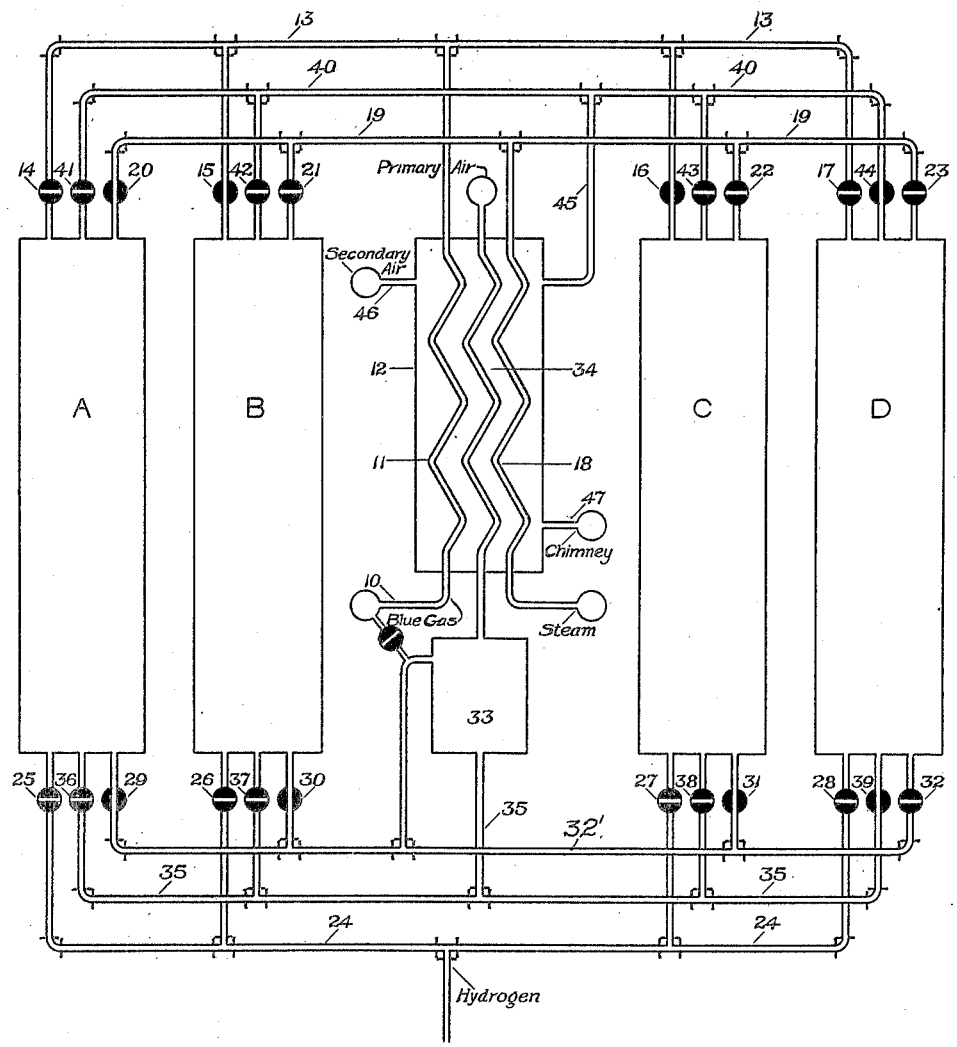

LYLE STOCKTON ABBOTT, OF RIVER EDGE, NEW JERSEY, ASSIGNOR TO THE IMPROVED EQUIPMENT COMPANY, OF NEW YORK, N. Y., A CORPORATION OF COLORADO.

PROCESS OF AND APPARATUS FOR PRODUCING HYDROGEN.

1,345,905.     Specification of Letters Patent.    Patented July 6, 1920.

Application filed November 6, 1915. Serial No. 60,011.

*To all whom it may concern:*

Be it known that I, LYLE STOCKTON ABBOTT, a citizen of the United States, residing at River Edge, in the county of Bergen and State of New Jersey, have invented certain new and useful Improvements in Processes of and Apparatus for Producing Hydrogen, of which the following is a specification.

This invention relates to processes of and apparatus for producing hydrogen; and it comprises a continuous method of producing hydrogen wherein a group of like reaction chambers containing ferriferous or ferruginous reaction material are simultaneously operated but out of phase with each other, one of said chambers being always in steaming or hydrogen-producing phase, one or more being in reducing phase and one or more being in heating phase, such chambers being advantageously in groups of 3 and 4 or more so that the heating phase or the reducing phase in any individual chamber may be given more time than the steaming or hydrogen producing phase, thereby allowing continuous production of hydrogen; and it also comprises a method of systematically utilizing reducing gas in the operation of grouped hydrogen producers wherein such gas is transmitted through one or more such producers to reduce the contact mass in the same, is thereafter partially burnt and employed in heating one or more producers in heating phase, and is finally completely burnt and employed for heating the various draft currents incident to the operation; and it further comprises a hydrogen producing plant comprising a group of producers adapted to operate in parallel but out of phase with suitable pipe connections for such operation; and it further comprises a hydrogen producing plant comprising a plurality of reaction chambers and pipe connections whereby reducing gas can be used successively for reducing the charge in one or more such chambers, thereafter can be partially burnt and used for heating other chambers and can be finally but completely burnt and used for imparting heat to draft currents; all as more fully hereinafter set forth and as claimed.

In the manufacture of hydrogen by alternate steaming and re-reduction of iron, the important considerations from a practical point of view are the conveyance and utilization of heat. The various chemical reactions taking place, in and of themselves, need no supply of heat since the oxidation and the reduction of the iron balance out thermally, but in practice, aside from radiation losses, the steam, hydrogen and waste gases, which, in the usual practice, enter the reaction zone at a comparatively low temperature and leave it at a comparatively high temperature, rapidly carry away the heat of the reaction mass. It must be remembered that since these reactions are mass actions, much more steam must be used than corresponds to the hydrogen produced; and much more reducing gas employed than corresponds to the amount of iron reduced thereby.

It is an object of the present invention to provide methods and means of improving the supply of heat to the reaction mass as well as to afford certain thermal and other economies in operation.

It is found that in practice the period during which steaming can be resorted to, that is during which hydrogen can be produced, is about a third of the time required for a complete cycle. Re-reduction takes about half again as long while heating requires half as much time. I therefore subdivide my contact mass of iron ore or the like into a group of substantially equal masses, say four or more such masses, contained in as many chambers and by means of suitable pipe connections arrange that one of these masses shall always be in steaming or hydrogen producing phase while another of the other bodies or masses is in heating phase and others are in reducing phase. By so doing, I make the production of hydrogen a substantially continuous operation.

I carry the heat necessary for the action into the reaction mass in the form of sensible heat of the various gas and steam currents. Because of the open porous nature of the reaction mass, which is necessary in obtaining large reaction surface, such a mass is a very bad conductor of heat and I do not therefore in the present embodiment of my invention, attempt any external heating of the containing chamber. On the other hand, I use my reducing material in a shaft-chamber with thick walls as little heat conductive as possible. The better the heat insulation the more economical is the operation of the apparatus. Within the shaft or chamber, the contact mass may be arranged in any suitable manner to give large surface and efficient contact with the various draft currents. The mass may be iron ore, artificial iron oxids, scrap iron, shaped iron bodies, etc. Many kinds of iron ore may be used. Iron ore of suitable texture gives a cheap and effective contact material.

In the reduction of iron ore or oxidized iron preparatory to the steaming phase, I ordinarily use blue gas, although producer gas and other combustible gas may be employed. Reduction being a mass action, a great part of this blue gas remains unchanged and the effluent gas is freely combustible. This effluent gas I mix with a portion of air and burn in a suitable combustion chamber, the amount of air used being not quite sufficient for complete combustion. The hot mixture of the still combustible gases and products of combustion from this combustion chamber I pass through one of the chambers containing iron ore for the purpose of heating the contact mass. The effluent gas from this heating operation which is, as stated, still somewhat combustible, is sent into a stove-like chamber where more air is added and complete combustion obtained. In this stove-chamber I heat the primary air which is used in the combustion chamber to burn (or partly burn) the combustible gas coming from a chamber in reduction phase.

At the beginning of the hydrogen producing phase, that is, before the steam is turned in, the conversion chamber is full of blue gas. As the steam enters and forms hydrogen this hydrogen displaces blue gas before it and the blue gas and the hydrogen pass to exit. At the time when the hydrogen appearing is judged sufficiently pure and free from blue gas it is cut off and sent to the hydrogen receiver. Naturally, the greater the purity desired for the hydrogen the later it is cut off, and the greater is the volume of hydrogen desired, the earlier is the cut-off. Displacement of blue gas by hydrogen is however not instantaneous but, in a way, rather gradual.

In ordinary methods of operation this residual blue gas and the first impure hydrogen are wasted but in the present invention I utilize them.

In the accompanying illustration I have shown more or less diagrammatically, certain assemblages of apparatus elements embraced within the present invention. In this showing Figure 1 is a vertical section of a reaction chamber;

Fig. 2 is a view in elevation with certain parts in vertical section, showing an assemblage of four reaction chambers, a combustion chamber and a heating element; and Fig. 3 is a diagrammatic development of Fig. 2 showing more clearly the course of the various draft currents.

In the showing of Fig. 1, numeral 1 indicates as a whole a shaft-like chamber of masonry or any other heat-retaining refractory material. A steel jacket 2 may be provided for the sake of strength and gas-tightness. An internal filling or charge 3 of iron ore, iron oxid, pieces of iron or other reaction material or a mixture of ore and iron is provided. A grate 4 of any suitable character may be used to support the charge. At the upper end of the chamber is the valved port 6 for introducing steam and reducing gas such as blue gas. Port 7 provides for exit of heating gases. At or near the bottom is inlet 8 for introduction of heating gases and outlet 9 for residual blue gas from a prior reduction and hydrogen.

Referring now to Figs. 2 and 3 but mainly to Fig. 3, these figures show four chambers A, B, C, and D, each of which is like the chamber of Fig. 1.

Gas main 10 brings blue gas from a suitable source of supply (not shown). This gas passes through a heating conduit 11 in a stove-like chamber 12. Beyond the heater is gas supply main 13, having valved connections 14, 15, 16 and 17 with the chambers A, B, C and D. Steam is sent through heating conduit 18 in the heater from the steam pipe or inlet 5 to steam line 19 having valved connections 20, 21, 22, and 23 with the several chambers. A hydrogen line 24 has valved connections 25, 26, 27 and 28 with the chambers, valved by-passes 29, 30, 31 and 32 communicating with cross pipe 32' being provided for utilizing impure hydrogen and blue gas remaining in the chambers after reduction of the iron. Near the heater element is a combustion chamber 33 of firebrick or the like. Air conduit 34 continuing through the heater is designed to supply heated primary air to this combustion chamber. Leading from the combustion chamber is a main 35 having valved communication at 36, 37, 38 and 39 with the several reaction chambers. Outlet conduit 40 has valved connections 41, 42, 43 and 44 with the several chambers. It enters the stove-like heater element at 45. Inlet 46 for secondary air serves for completing the combustion of the waste gases in such heater element. Products of complete combustion go to exit through 47 which leads to a stack or the like.

As the device is shown in Fig. 3, the valves in the various lines are set so that chamber A, which is in heated condition, is in the beginning of a steaming, that is hydrogen producing phase, while B and C are in reducing phase and D in heating phase. As shown, heated steam from 18 passes to line 19 and thence through 20 into A. Passing through the reaction mass it is converted (in part) into hydrogen which displaces residual blue gas from a prior reduction ahead of it. This residual blue gas and the first impure hydrogen are sent through 29 to the combustion chamber 33 for sufficient combustion to develop the desired amount of heat therein. When the effluent hydrogen is sufficiently pure 29 is closed and the gas is sent by 25 to hydrogen line 24. During this time blue gas enters at 10, is heated in 11 and passes to 13, whence it goes by 15 and 16 to chambers B and C which are arranged in parallel and are in reduction phase. Passing through B and C it is only partially oxidized and emerges in a freely combustible condition. It goes through 30 and 31 to combustion chamber 33 where its temperature is raised by admixture of and combustion with a modicum of hot air (which may be called primary air) coming from 34. The combustion here produced is only partial. The hot products of imcomplete combustion pass by 35 and 39 into D, D being in heating phase. The hot waste gases pass from D through 44, 40 and 45 to the stove. In stove 12 the combustion is completed by air from 46 and gas conduit 11, primary air conduit 34 and steam conduit 18 are heated by the heat developed.

After the steaming phase in A is complete it enters upon a heating phase while B in turn is steamed and C is further reduced.

While the conditions vary somewhat with variations in the particular construction of apparatus used, the nature and condition of the contact mass, the purity of gas desired, etc., it may be said that ordinarily if the steaming or hydrogen producing phase be continued for 20 minutes, the heating phase will take about 10 minutes and the reduction phase about 30 minutes. With a 20 minute period of steaming about 5 minutes will be consumed in purging if high grade hydrogen is to be made, leaving about 15 minutes for effective hydrogen production. It will be seen that with a 4-cell or 4-chamber apparatus hydrogen production may be continuous; one chamber always being in hydrogen making phase while another is in heating phase and two others are in reduction phase.

A connection 50 may be provided between the cross pipe 32' and the blue gas main 10 for returning the purge gases (blue gas and impure hydrogen) to such main. In the purging stage of the steaming phase the reaction chamber is under steam pressure sufficient to drive the purge gases into the blue gas main.

What I claim is:

1. The continuous process of producing hydrogen which comprises simultaneously operating with a plurality of bodies of ferruginous contact material, each of said bodies being successively heated, reduced and steamed and the operation being so conducted that one body is always in steaming and hydrogen producing phase while others are being heated and reduced.

2. The continuous process of producing hydrogen which comprises simultaneously operating with a plurality of bodies of ferruginous contact material, each of said bodies being successively heated, reduced and steamed and the operation being so conducted that one body is always in steaming and hydrogen producing phase, another body is in heating up phase and a plurality of others are in reduction phase.

3. In the continuous production of hydrogen with the aid of a plurality of bodies of ferruginous contact material operating simultaneously but out of phase with each other the process which comprises reducing one such body with hot combustible gas and admixing air in amounts insufficient for complete combustion with the effluent gases and leading the hot products of incomplete combustion through another body in heating phase.

4. In the continuous production of hydrogen with the aid of a plurality of bodies of ferruginous contact material operating simultaneously but out of phase with each other the process which comprises reducing one such body with hot combustible gas, admixing the effluent gases from such body with a modicum of air and leading through another body in heating phase, completing the combustion of the effluent gases therefrom and transferring the evolved heat to the combustible gases and to the air hereinbefore mentioned.

5. In the production of hydrogen with the aid of a ferruginous contact mass alternately reduced with combustible gas and steamed to give hydrogen the process which comprises admixing the gases appearing in the first stage of steaming with such combustible gas and reducing steamed iron with the admixture.

6. In the manufacture of hydrogen by alternate steaming, heating and reducing of ferruginous reaction masses, the process which comprises operating a plurality of intercommunicating masses with at least one of such masses always in steaming phase while the others are in heating phase and in reduction phase.

7. A plant for the continuous production of hydrogen comprising a plurality of reaction chambers each provided with a charge of ferruginous reaction material, an inlet for steam and an outlet for hydrogen, a combustion chamber, means for supplying air thereto, and conduit connections between said reaction chambers and said combustion chamber enabling reducing gas to be sent in succession through a reaction chamber, the combustion chamber and then again through a reaction chamber.

8. A plant for the continuous production of hydrogen comprising a plurality of reaction chambers each provided with a charge of ferruginous reaction material, an inlet for steam and an outlet for hydrogen, a combustion chamber, a combustible gas conduit, an air conduit for primary air and a steam conduit, a stove heater in heating relationship to said conduits, means for introducing secondary thereinto, and conduit connections between said reaction chambers and said combustion chamber and said reaction chambers and said stove heater enabling reducing gas to be sent in succession through a reaction chamber, through the combustion chamber, then again through a reaction chamber and finally through the stove heater.

9. In the manufacture of hydrogen by the alternate steaming and reduction of an iron contact mass the process which comprises separately collecting the combustible gases appearing in the first stage of the steaming phase, and returning such gases to the system in admixture with other combustible gases.

10. A continuous run plant for the manufacture of hydrogen which is made by a process involving distinct heating, steaming and reducing steps, a plurality of apparatuses, each apparatus capable of performing the whole process, and the number of such apparatus constituting the plant being so correlated to the time of operation of each such step that by simultaneous operation of the different steps in the different apparatus hydrogen may be continuously produced from the plant as a whole.

In testimony whereof I affix my signature.

LYLE STOCKTON ABBOTT.